(No Model.) 2 Sheets—Sheet 1.
E. SALOMON.
SPEED REGULATOR.
No. 513,148. Patented Jan. 23, 1894.
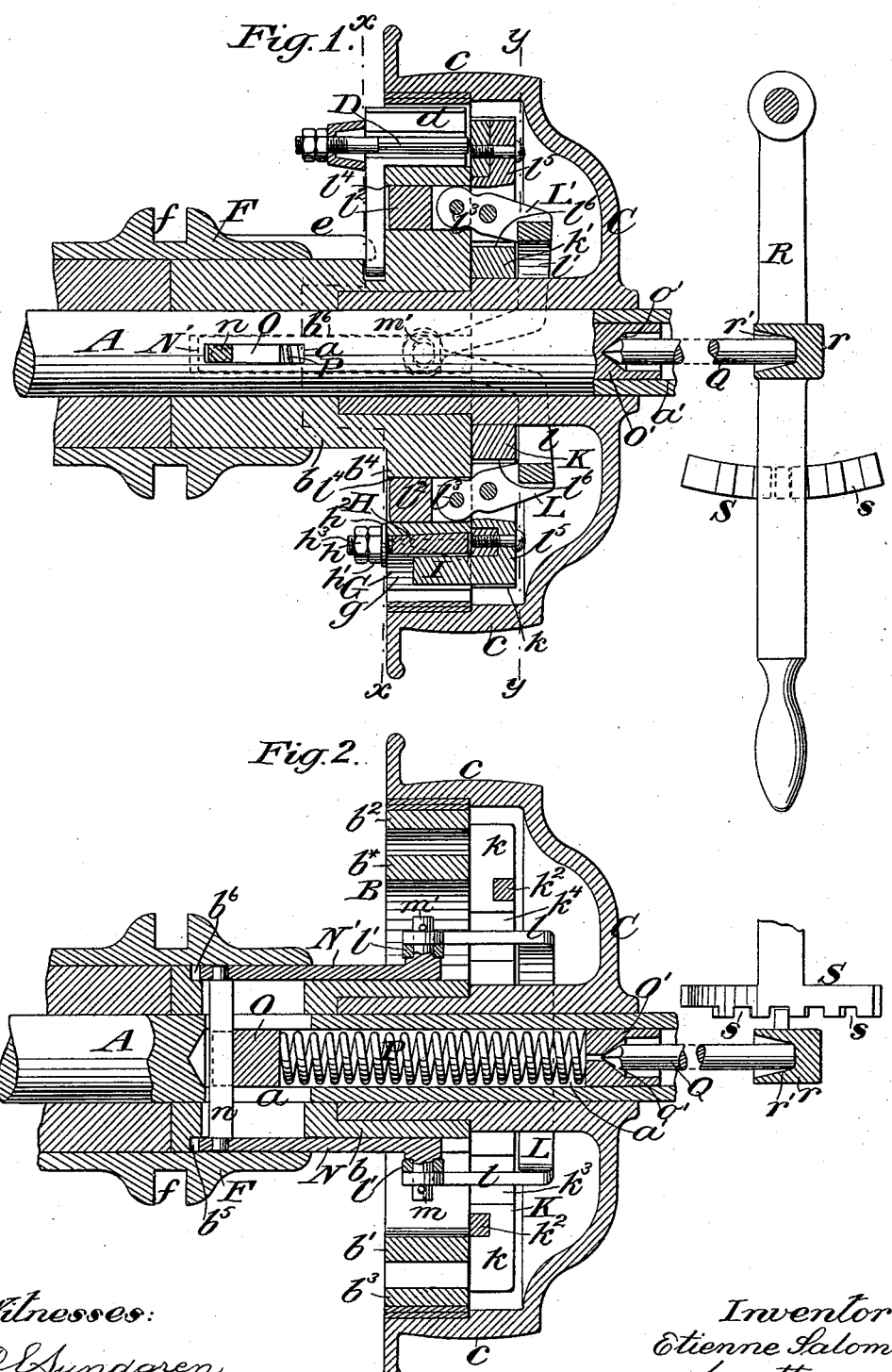
Witnesses:
C. E. Sundgren
D. H. Hayford
Inventor:
Etienne Salomon
by attorneys
Brown Seward (No Model.) 2 Sheets—Sheet 2.
E. SALOMON.
SPEED REGULATOR.
No. 513,148. Patented Jan. 23, 1894.
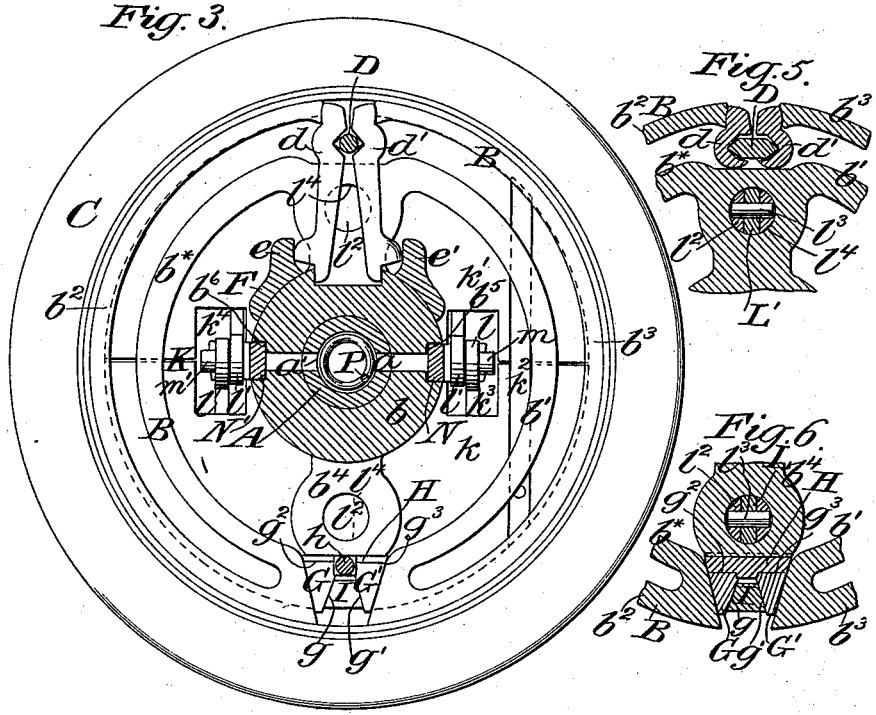
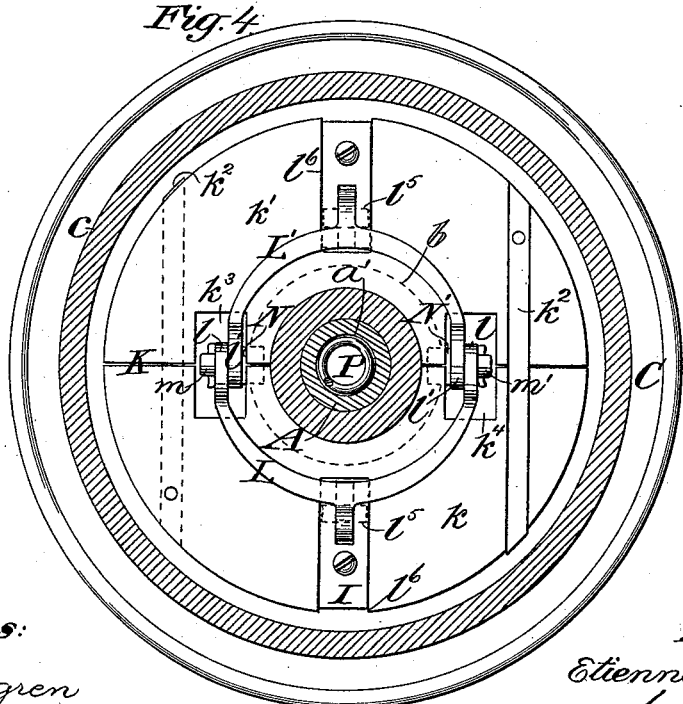
Witnesses:
C. E. Sundgren
D. K. Nayvort
Inventor:
Etienne Salomon
by attorneys
Brown Seward
THE NATIONAL LITHOGRAPHING COMPANY,
WASHINGTON, D. C.

UNITED STATES PATENT OFFICE.

ETIENNE SALOMON, OF NEW YORK, N. Y., ASSIGNOR OF ONE-HALF TO GEORGE SCHRADE, OF SAME PLACE.

SPEED-REGULATOR.

SPECIFICATION forming part of Letters Patent No. 513,148, dated January 23, 1894.

Application filed December 27, 1892. Serial No. 456,433. (No model.)

*To all whom it may concern:*

Be it known that I, ETIENNE SALOMON, a resident of New York, in the county and State of New York, have invented a new and useful Improvement in Speed-Regulators, of which the following is a specification.

My invention relates to an improvement in speed regulators in which provision is made for maintaining different rates of speed at the pleasure of the operator, by increasing or diminishing the amount of frictional contact between the driving and driven parts.

A practical embodiment of my invention is represented in the accompanying drawings, in which—

Figure 1 is a view of a clutch and a pulley in assembled adjustment, the view being taken in section in the plane of the axis of the shaft, the shaft being shown partly in section and partly in elevation. Fig. 2 is a section of the same taken at right angles to the first, and in the plane of the axis of the shaft. Fig. 3 is a view in transverse section on line $x, x$ of Fig. 1, looking toward the right. Fig. 4 is a view in transverse section through line $y, y$ of Fig. 1, looking toward the left, and Figs. 5 and 6 are partial transverse sections in detail of parts shown in elevation in Fig. 3.

A represents a shaft which may be driven from a suitable source of power not shown, and from which power is to be transmitted, by means of a clutch B keyed to the shaft, to a driving pulley C loosely mounted on the shaft. The clutch B consists of a central hub $b$ from one side of which curved branches $b^*$ and $b'$ extend in opposite directions spaced from the hub around to points a short distance apart at the opposite sides of the hub and then make a return bend and follow along back, forming the branches $b^2$ and $b^3$, spaced from the branches $b^*$ and $b'$ to points a short distance apart and radially opposite their points of emanation. The resulting structure is an expansible, double ring, the outer branches $b^2$ and $b^3$ of which may be sprung apart at their meeting ends to expand the clutch, while the double ring may be expansible as a whole by pressing apart the adjacent portions at the return bends. The pulley C to be acted upon by the clutch is provided with a rim $c$ adapted to surround the clutch, and the outer faces of the branches $b^2$ and $b^3$ of the clutch, or suitable wearing shoes thereon, are adapted to engage the inner surfaces of said rim $c$ or a suitable wearing shoe on said surface. The adjacent ends of the branches $b^2$ and $b^3$ may be separated by an adjustable wedge D on the opposite sides of which a pair of expanding levers $d$ and $d'$ are fulcrumed and operated by converging jaws $e$ and $e'$ on a sliding sleeve F, to clutch and release the pulley C at pleasure. The sleeve F may be keyed to the shaft A in any well known or approved manner so as to slide longitudinally thereof while forced to rotate with the clutch B, and said sleeve is provided with an annular groove $f$ to receive a shifter. (Not shown.)

The general structure as thus far described is quite similar to that shown and described in United States Letters Patent No. 354,242, granted to me December 14, 1886, and it is to the features which follow, either alone or in connection with those above enumerated that my present invention more particularly relates.

The expansible ring as a whole is expanded by a set of wedges inserted between the beveled ends, at the return bends, as follows: A pair of cheek pieces G, G' rest against the beveled faces of the ring and have their adjacent sides $g, g'$ beveled to diverge as they extend outwardly toward the periphery of the ring. Said cheek pieces also have their backs $g^2, g^3$ or sides toward the central portion of the ring beveled to receive an adjustable wedge H, which is inserted between the backs $g^2$ and $g^3$ of the cheek pieces and the face of an arm $b^4$ on the hub $b$. The wedge H serves, when advanced, to drive the cheek pieces outwardly and is provided with a threaded stem $h$ on which an adjusting nut $h'$ is engaged, to force the wedge, also a washer $h^2$ to hold the cheek pieces in position and a jam nut $h^3$, to lock the wedge in the desired adjustment. In addition to the above, the cheek pieces are constructed to be forced apart and the clutch expanded by a clutch expanding device consisting in the present instance of a wedge I, located between the faces $g, g'$ of the cheek pieces, by forcing the wedge I toward the center of the clutch. The wedge I is fixed to one of the half sections $k$ of a disk K located in proximity to the side of the clutch within the pulley C. The half sections $k$ and $k'$ of the disk K are connected by dowels $k^2$ on which they are free to move away from and toward each other and thereby controlling the movements of the wedge I to expand the clutch or permit it to contract. A pair of bent levers L and L', located diametrically opposite each other are fulcrumed upon suitable bearings in the side of the clutch B and extend thence through the sections $k$ and $k'$, one through each. The said levers are pivotally secured to the sections and after passing through them, separate into two branches $l$, and $l'$, which turn downwardly and return, upon opposite sides of the shaft A, through openings $k^3$ and $k^4$ in the movable sections $k$ and $k'$ and through the clutch B to the pivots $m$ and $m'$ on sliding connecting bars N and N', seated in channels $b^5$ and $b^6$ on the hub of the clutch. The bars N and N' are united by a cross head $n$ which extends transversely through an elongated slot $a$ in the shaft A, and bears against a head block O seated within a hollow portion $a'$ of the shaft A. A spring P located in said hollow portion of the shaft; between the head block O, and an adjustable bearing block O', has a tendency to force the cross head $n$ away from the expansible disk K and hence to rock the levers L and L' in a direction to force the half sections of the disk toward each other and thereby press the wedge I between the ends of the clutch ring to expand it. As a matter of preference, I secure the fulcrumed ends of the levers L and L' in the bifurcated ends of plugs $l^2$ by cross pins $l^3$ and then force the plugs tightly into sockets $l^4$ in the hub $b$ of the clutch or in arms of the hub. I also find it expedient to pivot the levers in bifurcated bearing pieces $l^5$ which may be secured in recesses $l^6$ formed in the sections $k$ and $k'$ of the expansible disk. The tension of the spring P may be varied to increase the friction of the clutch and thereby set it to produce different predetermined rates of speed by means of a presser bar or rod Q engaged at one end with the adjustable bearing block O' and at its opposite end with a socket piece $r$ on an operating lever R. The end of the presser bar Q engaged with the bearing block O' is made pyramid shape to enter a tapered socket $o'$ by which the presser bar is caused to rotate with the shaft, while its opposite end is squared and bears against the bottom of the socket $r'$ in the socket piece $r$. The lever R is arranged to swing over a graduated scale S, having retaining seats $s$ at such intervals as may be found expedient, each of the different seats being indexed in any well known or approved manner to denote the number of revolutions which the pulley C will make when the lever R is seated therein.

In operation: The lever R, having been adjusted to impart to the spring P the necessary tension to expand the clutch B to grip the pulley C with sufficient force to make the desired number of revolutions per minute, the half sections of the expanding disk K will regulate the speed at the rate determined upon as follows: If the speed should increase beyond the rate desired, the centrifugal force would tend to throw the half sections $k$ and $k'$ apart against the tension of the spring P acting through the levers L and L' and would thereby force the wedge I outwardly, permitting the clutch B to contract until there was a sufficient amount of slipping between the clutch and the pulley to reduce the speed to the proper rate. If on the other hand, the speed should fall below that desired, the centrifugal force of the sections $k$ and $k'$ would be diminished, permitting the spring P to increase its actual force upon the wedge I to cause the further expansion of the clutch and hence decrease the slipping until the proper rate is again reached.

It is obvious that slight changes might be resorted to in the form and arrangement of the several parts described without departing from the spirit and scope of my invention; hence I do not wish to limit myself strictly to the construction herein set forth; but

What I claim is—

1. The combination with the expansible and contractible clutch and the part to be clutched by it, of a clutch expanding device under the control of the operator to set the clutch to produce different speeds, and an expanding device controlling mechanism engaged with the clutch for maintaining the speed at the rate to which the clutch is set, substantially as set forth.

2. The combination with an expansible and contractible clutch and a part to be clutched by it, of clutch expanding mechanism under the control of centrifugal force to operate the clutch, and clutch setting mechanism connected with said clutch expanding mechanism and under the control of the operator to vary the effect of the centrifugal force upon the clutch expanding mechanism at any moment, substantially as set forth.

3. In combination, a shaft, an expansible and contractible clutch mounted to rotate with the shaft, a pulley loosely mounted on the shaft in position to be engaged by the clutch, a clutch expanding device, a laterally sliding part for controlling the clutch expanding device a lever fulcrumed on the clutch and pivotally secured to the said laterally sliding part, a spring seated within the shaft, a connection between the spring and the lever and means for regulating the tension of the spring, substantially as set forth.

4. In combination, a shaft, an expansible and contractible clutch mounted to rotate therewith, a pulley loosely mounted on the shaft in position to engage the clutch, a clutch expanding device, a part free to move toward and away from the shaft under the influence of centrifugal force to operate the clutch expanding device, a lever fulcrumed on the clutch and pivotally secured to the said movable part, a spring seated within the shaft and connected with the lever, a sliding block engaged with the spring, a lever, means for holding the lever in different predetermined adjustments and a connection between the lever and the sliding block for varying the tension of the spring as the lever is placed in its different adjustments, substantially as set forth.

5. In combination, a shaft, an expansible and contractible clutch mounted to rotate with the shaft, a pulley loosely mounted on the shaft in position to engage the clutch, movable sections adjacent to the clutch and free to move in opposite directions toward and away from the shaft under centrifugal force, a clutch expanding device connected with one of said sections, levers fulcrumed on the clutch upon opposite sides of the shaft and pivotally secured, the one to one of said sections and the other to the other of said sections, a spring within the shaft and a connection between the spring and the levers by which they are caused to move in unison under the influence of the spring and under the influence of the centrifugal force to operate the clutch, substantially as set forth.

6. The combination with the expansible and contractible clutch, of a sliding wedge permanently secured between the adjacent ends of the expanding portion of the clutch, means for holding the wedge in different adjustments, a wedge free to move toward and away from the center of the clutch between said adjacent ends of the expanding portion of the clutch and a movable part connected with the last named wedge and free to move toward and away from the axis of the clutch under the influence of centrifugal force, substantially as set forth.

ETIENNE SALOMON.

Witnesses:
FREDK. HAYNES,
GEORGE BARRY.